(12) United States Patent
Sackl

(10) Patent No.: US 6,960,996 B2
(45) Date of Patent: Nov. 1, 2005

(54) DEVICE FOR LOCATING TRAPPED VICTIMS AND A METHOD OF OPERATING SUCH A DEVICE

(75) Inventor: Rudolf Sackl, Deutschlandsberg (AT)

(73) Assignee: Seidel Elektronik GmbH NFG. KG, Deutschlandsberg (AT)

( * ) Notice: Subject to any disclaimer, the term of this patent is extended or adjusted under 35 U.S.C. 154(b) by 85 days.

(21) Appl. No.: 10/755,669

(22) Filed: Jan. 13, 2004

(65) Prior Publication Data

US 2004/0155776 A1 Aug. 12, 2004

(30) Foreign Application Priority Data

Jan. 15, 2003 (AT) .......................................... A 47/2003

(51) Int. Cl.[7] ............................................... G08B 1/08
(52) U.S. Cl. ............................ 340/539.11; 340/539.13; 340/539.21; 340/539.23; 340/573.1
(58) Field of Search ..................... 340/539.1, 539.11, 340/539.13, 539.21, 539.23, 573.1, 573.5, 573.7; 342/22, 27, 51; 343/760; 455/92, 100

(56) References Cited

U.S. PATENT DOCUMENTS

| | | | | |
|---|---|---|---|---|
| 4,468,656 A | * | 8/1984 | Clifford et al. ........ | 340/539.11 |
| 4,656,478 A | * | 4/1987 | Leuenberger ................. | 342/51 |
| 6,031,482 A | * | 2/2000 | Lemaitre et al. .............. | 342/22 |
| 6,246,376 B1 | * | 6/2001 | Bork et al. ................. | 343/760 |
| 6,246,863 B1 | * | 6/2001 | Kampel ...................... | 455/100 |
| 6,567,036 B1 | * | 5/2003 | Eckhard ...................... | 342/22 |

* cited by examiner

Primary Examiner—Van T. Trieu
(74) Attorney, Agent, or Firm—Dykema Gossett PLLC

(57) ABSTRACT

A locating device, particularly for locating trapped victims under avalanches, under debris or under collapsed buildings, equipped with a receiving unit (6-13) for signals from transmitters and preferably a transmitter (13, 14), as well as optical (6) and/or acoustic (12) display units, whereby the receiving unit is connected to three preferably orthogonally arranged ferrite rod antennas (2, 3, 4). All antennas (2, 3, 4) are disposed in a compact housing (1) together with the receiving unit (6-13) and preferably also the transmitter (13, 14) to ensure accurate locating of the trapped victim across the largest range possible at compact design whereby one antenna (4) is of substantially shorter length than the two other antennas (2, 3). The receiving unit is provided with a DSP module (11) for incoming signals of the antennas (2, 3, 4).

15 Claims, 3 Drawing Sheets

DEVICE FOR LOCATING TRAPPED VICTIMS AND A METHOD OF OPERATING SUCH A DEVICE

BACKGROUND OF THE INVENTION

1. Field of the Invention

The present invention relates to a locating device, particularly for locating trapped victims under avalanches, under debris or under collapsed buildings, including a receiving unit for signals from transmitters, preferably a transmitter connected to three preferably orthogonally arranged ferrite rod antennas, optical and/or acoustic display units, as well as a method for the operation of a locating device, particularly for locating trapped victims under avalanches, under debris or under collapsed buildings, whereby incoming signals of one or several transmitters are monitored by a receiving unit.

2. The Prior Art

Current portable devices for locating trapped victims are equipped with devices to detect and display the magnitude and possibly the direction of the magnetic field strength of a transmitter. This displayed information is used to advance toward the trapped victim along field lines. In most cases, one or two ferrite receiving antennas are provided for this purpose which are mounted in a common housing together with the processing electronics and the display devices whereby the possible rod length limits the range of transmission and whereby accurate point locating is also made difficult in the case of two antennas. The rescuer may reach positions during the search for a point location at which the field strength is oriented completely vertical and at which the horizontal plane equals zero. Inexperienced rescuers cannot determine the exact location of the trapped victim in this case. In such cases, even devices with a "virtual" antenna are useless as described, for example, in EP 0 855 600 A2. Otherwise, devices having three identical, preferably orthogonally oriented actual antennas, as disclosed in EP 0 733 916 A2, for example, are too bulky and unmanageable or they have too short of a range for a meaningful search while being designed of small dimensions.

The object of the present invention was therefore to provide a device of the aforementioned type which makes possible, in a simple manner, locating of a trapped victim at a range as large as possible without being susceptible to operational errors and which is nevertheless dimensioned in such a compact manner that is does not restrict the movement of the operator during the search, and whereby it can be carried along during other activities. An additional object of the invention was a method to operate a device of the aforementioned type with which locating of several trapped victims is possible in succession in a simple and reliable manner.

SUMMARY OF THE INVENTION

It is proposed for the achievement of the first object that all antennas are placed in a compact housing together with the receiving unit and preferably also a transmitter whereby one antenna is of shorter length than the other two antennas. This short third antenna is sufficient to make three-dimensional position-finding of the transmitter possible at close range and not confuse the rescuer at the positions with vertical field orientation but to guide him directly to a specific location where the trapped victim is located. In addition, this antenna contributes to the increase of signal strength of the incoming signal at close range.

According to a preferred embodiment of the inventive device, it is advantageously proposed that the shortest antenna is maximally half as long as the longest antenna of the locating device, preferably approximately one quarter-length of the longest antenna.

The receiving unit is provided with a DSP module (digital signal processor module) for incoming signals of the antennas according to an additional characteristic of the invention. The incoming signal is very weak and hardly noticeable because of noise interference at some distance from the trapped victim. The extremely weak transmission signal can be recognized within the noisy incoming signal by means of a digital signal processor and its range can be considerably increased thereby.

It is advantageously proposed thereby that the receiving unit includes a subassembly for the transformation of incoming signals by way of fast Fourier transformation whereby the subassembly is preferably integrated in the DSP module.

According to an additional characteristic of the invention, additional components such as preferably an altimeter, thermometer or compass may be integrated, which can give a rescuer additional information during the course of the rescue action.

The secondly cited object is achieved according to the invention in that all received incoming signals are registered over a predetermined period whereby discriminating characteristics of at least these incoming signals are registered and whereby the receiving unit can be tuned to one of these incoming with the aid of the characteristics. A reliable and rapid search is made possible through these characteristics even in the case of several trapped victims located within the receiving range so that the rescuer will not be confused by the high number of incoming signals. The recognition of several transmitters and the determination of the number of transmitters is made possible based on the standardized signal characteristic of the avalanche victim locating device whose transmitters transmit typically at 100 milliseconds at a constant transmission frequency and which subsequently pauses for at least 400 milliseconds. If a transmitted signal is received within the defined pause, or if the received pulse surpasses a specific time range, or if the pulses have a highly different amplitude, then these are indicators for the presence of more than one transmitter in the receiving range of the device of the rescuer. Small discriminating signal characteristics exist for different transmitters based on the predetermined tolerance of the transmitter, and based on these differences, the receiver recognizes which signal pulses come from which specific transmitter. Characteristics for transmitter identification can be the entire duration of one period, time of transmission, length of pauses, amplitude or transmission frequency. The receiver selects now a transmitter automatically or upon confirmation by the user, which means the receiver synchronizes to this one specific transmitter.

Furthermore, it can be proposed that the receiver identifies the number of additionally existing transmitters of the trapped victims.

It is advantageously proposed thereby that the signal strength or amplitude of the incoming signal is used as discriminating characteristic. This quantity can be determined very simply and it allows rapid tuning of the device to a specific incoming signal.

Since there are always differences between the individual transmitters, in spite of general determination of the signal characteristic, based on tolerance and other influences on the transmitters, and on the transmitting signals as well, there can be used as discriminating characteristic the duration of the pulse or the time of transmission of the incoming signal according to an additional or alternative embodiment of the method.

The same applies also to the frequency of the signals, which are set at 457 kHz according to standards; however, from the set value occur small deviation as well so that the frequency of the incoming signal can also be used as discriminating characteristic.

According to an additional characteristic of the invention, a reliable search for one of the additionally existing transmitters can be initiated, after successfully locating the transmitter of the monitored incoming signal, if the previously monitored incoming signals are filtered out subsequent to the reception of incoming control signals in the receiving unit. The device can be switched by the rescuer in such a manner that the signal with the currently synchronized characteristic is filtered out so that synchronization to another transmitter is made possible and thus the search for the next trapped victim is made possible as well.

The receiving unit is thereby advantageously tuned to the remaining incoming signals with the aid of discriminating characteristic.

According to an additional characteristic of the invention, it is proposed that the characteristic of signals is preferably determined by means of fast Fourier transformation with the advantage of optimum signal identification and signal discrimination in case of several existing transmitters, which means, during the search for multiple trapped victims.

BRIEF DESCRIPTION OF THE DRAWINGS

The invention will be described in more detail in the following description with the aid of the accompanying drawings wherein.

DETAILED DESCRIPTION OF THE PREFERRED EMBODIMENTS

Three ferrite antennas 2, 3 and 4 are disposed in the housing 1 of the inventive locating device. The antennas are preferably orthogonal to one another and of various lengths to make possible the compact traditional dimensioning of the housing 1 in terms of its shape. The shortest antenna 4 is maximally half as long as the longest antenna 2 of the locating device, while the two longer antennas 2 and 3 have lengths of approximately 8 cm or 6 cm. The length of antenna 4 is preferably approximately a quarter-length of the longest antenna 2, which is approximately 2 cm in absolute numbers.

Figure 1:
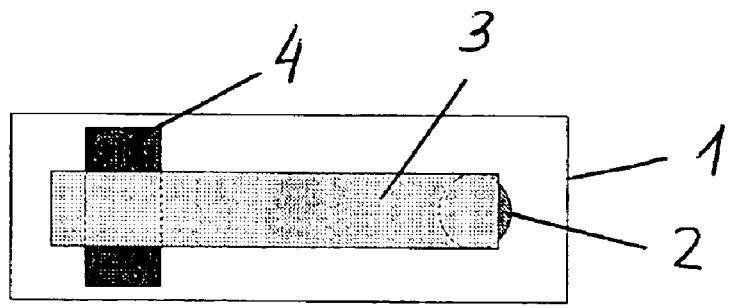
FIG. 1 shows a schematic front view of an embodiment for the inventive device.
Figure 2:
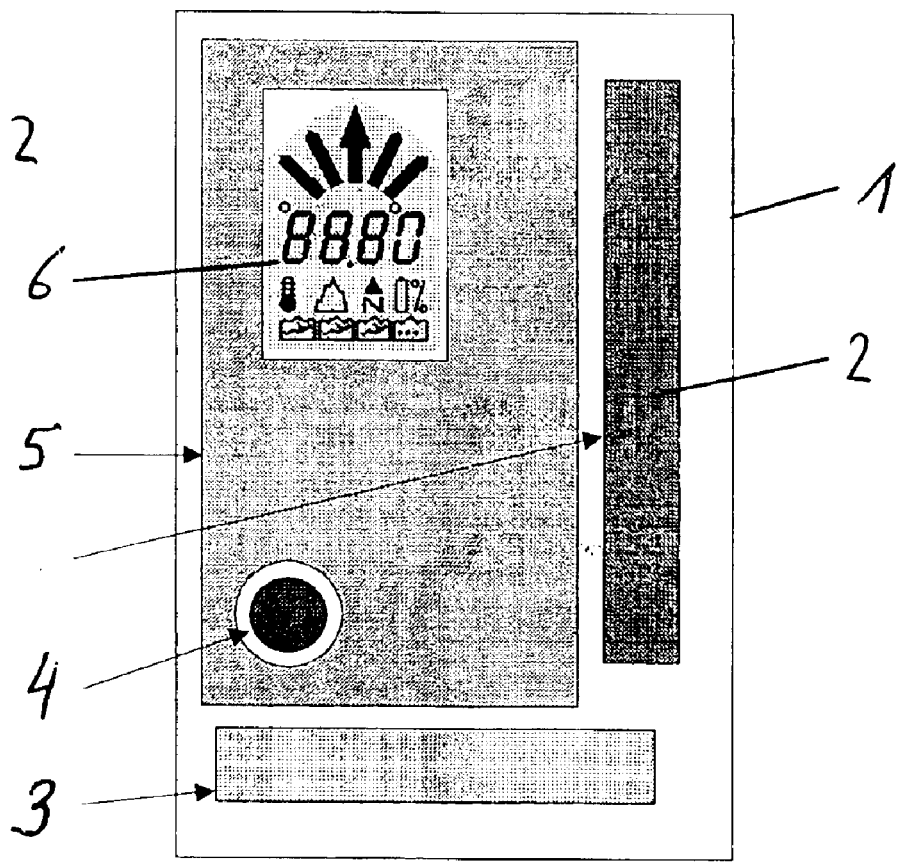
FIG. 2 is a schematic top view onto the device in FIG. 1.

As can seen in FIG. 2, the two longer antennas 2 and 3 lie essentially parallel to the lateral side or the face of a printed circuit board 5, which contains receiving and transmitting electronics and on the optical display unit 6 attached to said printed circuit board as well. Symbols are provided on the display unit 6 that may be triggered to determine direction and distance to the incoming transmitter, for example, and possibly additional information such as the presence of other transmitters, temperature, altitude, compass bearing, battery condition, etc. The presence of additional transmitters can be detected as described below while other information is added through preferably electronic units, such as a thermometer, altimeter or compass provided in the device.

The third and shortest antenna 4 extends preferably through a boring in the printed circuit board 5.

Figure 3:
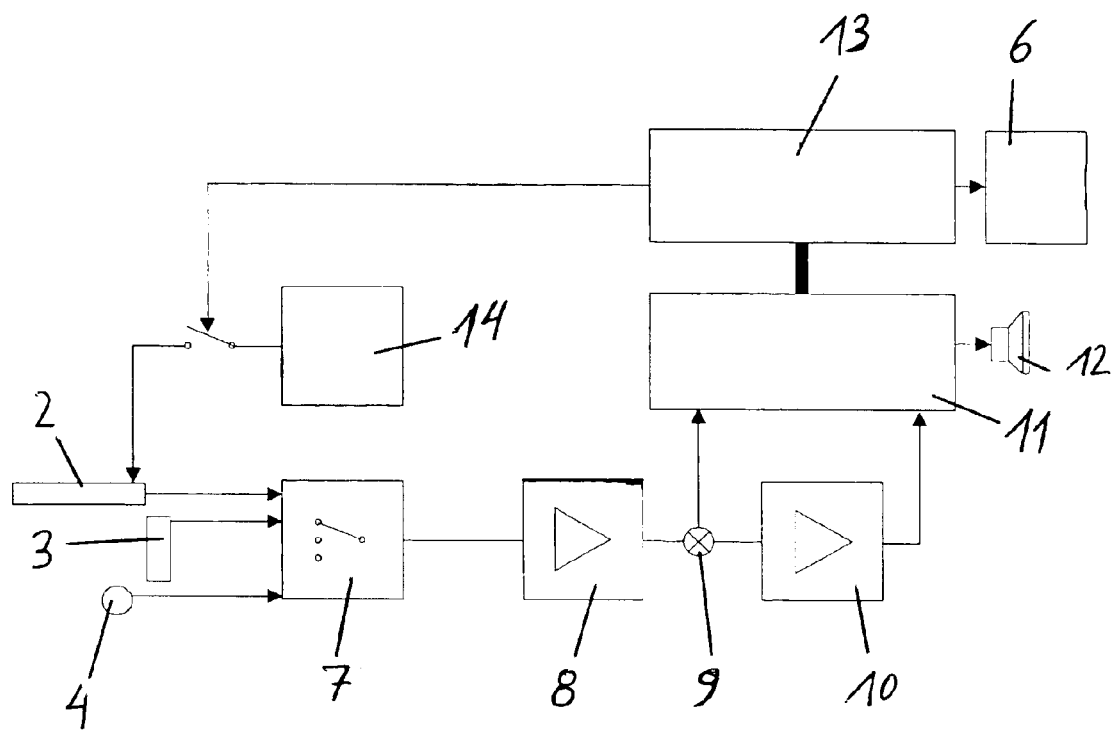
FIG. 3 is a simplified block diagram of the inventive device.

The basic electronic circuit can be seen with the aid of the block diagram of FIG. 3 in which components are not show for reason of clarity, which are not part of the invention, and which common components are known to those skilled in the art. It is obvious, for example, that the symbols for the antenna 2, 3, 4 include naturally the associated resonating circuits and similar components. The antennas 2, 3, 4 are individually connected to a antenna selector switch 7, which switches alternately between the antennas 2, 3, 4 during reception of the device and which transmits the signal of a respective antenna. An amplifier 8 is provided behind the antenna selector switch 7 from which amplifier 8 the signal reaches a second amplifier 10 via a mixer 9.

One output of the mixer 9 and the output of the amplifier 10 are connected to the digital signal processor module 11. An audio signal output unit 12 can be connected directly to said DSP module 11, which consists of the actual digital signal processor itself and its peripherals, and which is designed for signal processing by means of fast Fourier transformation (FFT).

However, in each case there is an optical display unit 6 provided, which is controlled by a micro-controller 13 and the micro-controller 13 is coupled to the DSP module 11 (as already illustrated in FIG. 2). The micro-controller 13 also controls a switch that connects a preferably existing transmitting oscillator 14 preferably to the longest antenna 2, if the device is to be operated in the transmitting mode.

Figure 4:
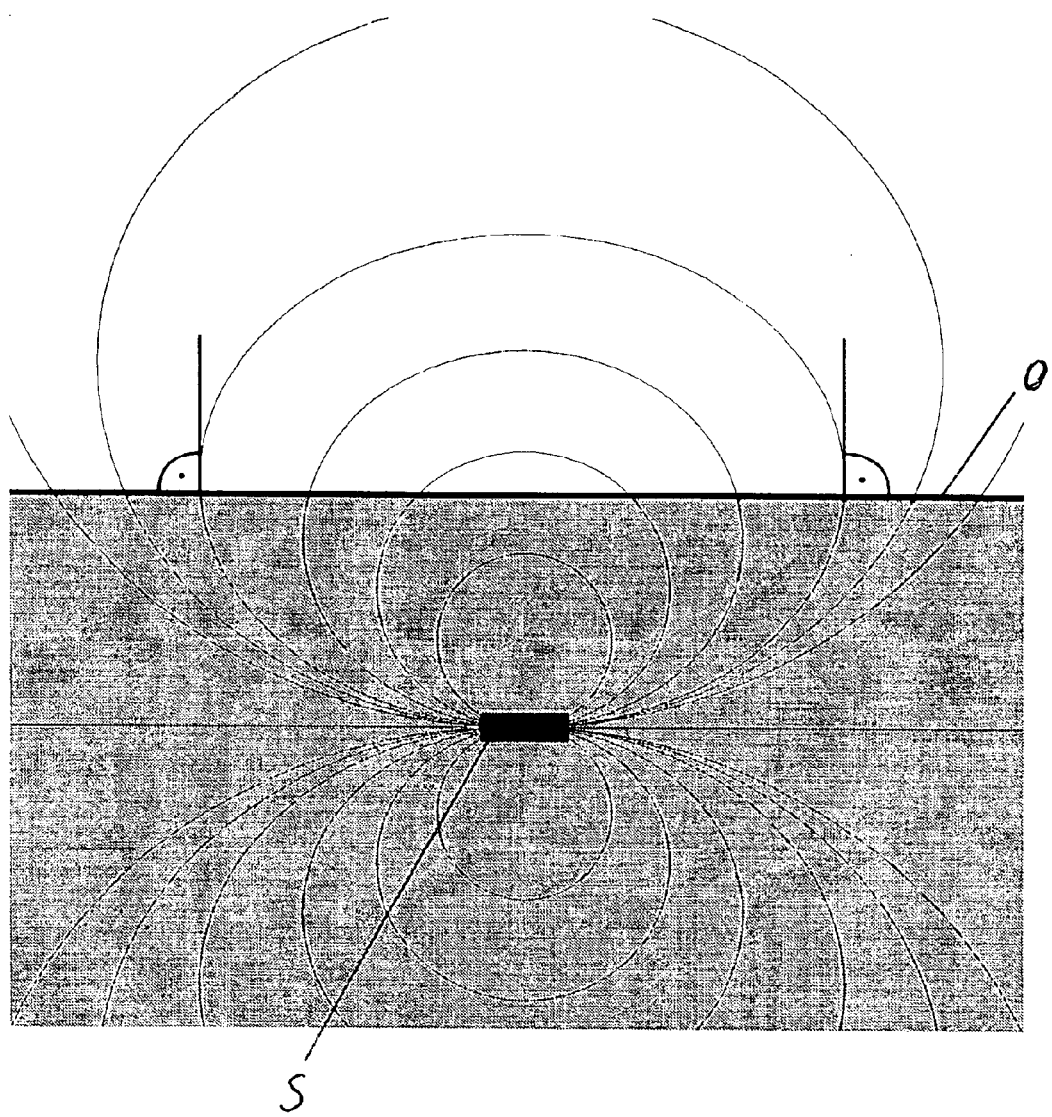
FIG. 4 illustrates the field line course in case of a horizontally placed transmission antenna.

The locating device is normally held parallel to the snow surface O and the field strength received mainly by the longer antennas 2, 3 increases continuously while approaching the transmitter. In case of the unfortunate case in which the transmitting antenna S lies horizontally in the snow (see FIG. 4) then the field strength increases also continuously while approaching said transmitter; however, the direction of the field lines turns increasingly from the horizontal direction to the vertical direction and subsequently horizontal again (directly on top of the transmission antenna).

For an inexperienced rescuer who holds his receiving device usually in a horizontal position and whereby the two longer antennas 2 and 3 are also horizontal relative to the snow surface O, the circumstances are as follows:

the field strength increases while approaching the transmitter (=the distance reading on the display 6 decreases), the horizontal component of the field becomes smaller and the distance reading increases again at some time based on the turning of the field lines.

An inexperienced rescuer believes therefore that the trapped victim is located under the maximum field strength (a minimum of distance reading), whereas an experienced operator continues to walk a few meters in the original direction to be on the safe side and to determine if there can be found yet a greater maximum field strength after the point of decrease in field strength. Should this occur, then rescuers search and dig there manually by using an avalanche probe.

The field can be measured in a three-dimensional manner with the short third antenna 4 in the immediate vicinity of the transmitting antenna S since the transmitter field strength in the immediate vicinity of the transmitter is so great that the short third antenna 4 can contribute a sufficient signal component for a three-dimensional representation—it is in the immediate vicinity of said transmitting antenna S where the problem of the false maximum (minimum) exists caused by the vertical field lines. The inventive device guides therefore even an inexperienced user reliably, without operational errors, clearly and directly to the specific location of the transmitter and thereby also to the trapped victim (maximum field strength—lowest distance reading).

What is claimed is:

1. A locating device, particularly for locating trapped victims under avalanches, under debris or under collapsed buildings, comprising a receiving unit for signals from transmitters, a transmitter connected to three orthogonally arranged rod antennas, optical and/or acoustic display units, wherein all antennas are placed in a compact housing together with the receiving unit and also a transmitter whereby one antenna is of shorter length than the other two antennas.

2. A locating device according to claim 1, wherein the antenna of shorter length is maximally half as long as a longest antenna of the locating device.

3. A locating device according to claim 2, wherein the antenna of shorter length is about one quarter the length of the longest antenna.

4. A locating device according to claim 1, wherein the receiving unit is provided with a DSP module (digital signal processor module) for incoming signals of the antennas.

5. A locating device according to claim 4, wherein the receiving unit includes a subassembly for the transformation of incoming signals by way of fast Fourier transformation whereby said subassembly is integrated in the DSP module.

6. A locating device according to claim 1, wherein additional components selected from the group consisting of altimeter, thermometer and compass are integrated.

7. A method for the operation of a locating device, particularly for locating trapped victims under avalanches, under debris or under collapsed buildings whereby incoming signals of one or several transmitters are monitored by a receiving unit, wherein all received incoming signals are registered over a predetermined period whereby discriminating characteristics of at least these incoming signals are registered and whereby the receiving unit can be tuned to one of these incoming signals with the aid of said characteristics.

8. A method according to claim 7, whereby an entire duration of one period of the incoming signal is used as discriminating characteristic.

9. A method according to claim 7, whereby a duration of a pulse or the time of transmission of the incoming signal is used as discriminating characteristic.

10. A method according to claim 7, whereby a duration of pause of the incoming signal is used as discriminating characteristic.

11. A method according to claim 7, whereby signal strength or amplitude of the incoming signal is used as discriminating characteristic.

12. A method according to claim 7, whereby a frequency of the incoming signal is used as discriminating characteristic.

13. A method according to claim 7, whereby previously monitored incoming signals are filtered out subsequent to reception of incoming control signals in the receiving unit.

14. A method according to claim 13, whereby the receiving unit is advantageously tuned to the remaining incoming signals with the aid of discriminating characteristic.

15. A method according to claim 7, whereby the characteristic of signals is determined by means of fast Fourier transformation.

\* \* \* \* \*